United States Patent
Wu et al.

(10) Patent No.: US 7,203,363 B2
(45) Date of Patent: Apr. 10, 2007

(54) STRING EXTRACTION METHOD FOR IMAGE BASED ON MULTIPLE STROKE WIDTH PATTERNS MATCHING

(75) Inventors: Quen-Zong Wu, Taoyuan (TW); Heng-Sung Liu, Taoyuan (TW); Yuang-Tzong Lan, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 726 days.

(21) Appl. No.: 10/606,791

(22) Filed: Jun. 27, 2003

(65) Prior Publication Data
US 2004/0264776 A1 Dec. 30, 2004

(51) Int. Cl.
G06K 9/34 (2006.01)
G06K 9/46 (2006.01)

(52) U.S. Cl. .................... 382/174; 382/190
(58) Field of Classification Search .............. 382/174
See application file for complete search history.

(56) References Cited

U.S. PATENT DOCUMENTS

| | | | | |
|---|---|---|---|---|
| 5,050,224 A | * | 9/1991 | Mori | 382/216 |
| 5,228,095 A | * | 7/1993 | Abe | 382/174 |
| 5,438,656 A | * | 8/1995 | Valdes et al. | 345/443 |
| 5,581,663 A | * | 12/1996 | Zlotin et al. | 706/46 |

* cited by examiner

*Primary Examiner*—Joseph Mancuso
*Assistant Examiner*—Hadi Akhavannik
(74) *Attorney, Agent, or Firm*—Rabin & Berdo, P.C.

(57) ABSTRACT

A string extraction method for an image based on multiple stroke width patterns matching is provided. The string extraction method includes matching each possible stroke width pattern with an input image for obtaining the similarities between the width patterns and each pixel, wherein the integrated similarity between each pixel and the stroke width patterns is namely an integrated computing result of all similarities between the pixel and all stroke width patterns.

10 Claims, 6 Drawing Sheets

| -1/8 | -1/8 | -1/8 | -1/8 | 1/6 | 1/6 | 1/6 | 1/6 | 1/6 | 1/6 | -1/8 | -1/8 | -1/8 | -1/8 |
|---|---|---|---|---|---|---|---|---|---|---|---|---|---|

Fig. 2 (A)

| -1/8 | -1/8 | -1/8 | -1/8 | 1/8 | 1/8 | 1/8 | 1/8 | 1/8 | 1/8 | 1/8 | 1/8 | -1/8 | -1/8 | -1/8 | -1/8 |
|---|---|---|---|---|---|---|---|---|---|---|---|---|---|---|---|

Fig. 2 (B)

| -1/8 | -1/8 | -1/8 | -1/8 | 1/10 | 1/10 | 1/10 | 1/10 | 1/10 | 1/10 | 1/10 | 1/10 | 1/10 | 1/10 | -1/8 | -1/8 | -1/8 | -1/8 |
|---|---|---|---|---|---|---|---|---|---|---|---|---|---|---|---|---|---|

Fig. 2 (C)

| -1/16 | -1/16 | -1/16 | -1/16 | 1/12 | 1/12 | 1/12 | 1/12 | 1/12 | 1/12 | -1/16 | -1/16 | -1/16 | -1/16 |
|---|---|---|---|---|---|---|---|---|---|---|---|---|---|
| -1/16 | -1/16 | -1/16 | -1/16 | 1/12 | 1/12 | 1/12 | 1/12 | 1/12 | 1/12 | -1/16 | -1/16 | -1/16 | -1/16 |

Fig. 3 (A)

| -1/16 | -1/16 | -1/16 | -1/16 | 1/16 | 1/16 | 1/16 | 1/16 | 1/16 | 1/16 | 1/16 | 1/16 | -1/16 | -1/16 | -1/16 | -1/16 |
|---|---|---|---|---|---|---|---|---|---|---|---|---|---|---|---|
| -1/16 | -1/16 | -1/16 | -1/16 | 1/16 | 1/16 | 1/16 | 1/16 | 1/16 | 1/16 | 1/16 | 1/16 | -1/16 | -1/16 | -1/16 | -1/16 |

Fig. 3 (B)

| -1/16 | -1/16 | -1/16 | -1/16 | 1/20 | 1/20 | 1/20 | 1/20 | 1/20 | 1/20 | 1/20 | 1/20 | 1/20 | -1/16 | -1/16 | -1/16 | -1/16 |
|---|---|---|---|---|---|---|---|---|---|---|---|---|---|---|---|---|
| -1/16 | -1/16 | -1/16 | -1/16 | 1/20 | 1/20 | 1/20 | 1/20 | 1/20 | 1/20 | 1/20 | 1/20 | 1/20 | -1/16 | -1/16 | -1/16 | -1/16 |

STRING EXTRACTION METHOD FOR IMAGE BASED ON MULTIPLE STROKE WIDTH PATTERNS MATCHING

BACKGROUND OF THE INVENTION

1. Field of the Invention

The present invention relates to a string extraction method for an image based on multiple stroke width patterns matching, and more particularly to a string extraction method which can be applied in extracting an license plate number for an automatic recognizing system, a traffic monitoring and a car entrance guard, a container number in a container image, a string in an advertising shop sign, a string in a traffic sign image, a bar code in a bar code image, or a string in a journalism image.

2. Description of the Prior Art

The string extraction of an image is a pre-processing procedure for the string/character recognition, and thus the accuracy thereof will significantly affect the whole performance of the string/character string recognition.

The conventional string extraction for an image is generally processed by calculating the gradient of each pixel, or determining the position of a string based on a computing result of each pixel obtained through an edge detection. However, in these methods, it ignores that not only the gradient or the edge can represent the stroke of each character in the string. Furthermore, the width of each stroke may be different and the width in the same stroke also would have differences according to the size of the picture or the picturing distance.

Thus it can be seen, the prior art described above still has some defects, is not a good design, however, and is urgently to be improved.

Because of the technical defects of described above, the applicant keeps on carving unflaggingly to develop the string extraction method for an image based on a multiple stroke width patterns matching through wholehearted experience and research.

SUMMARY OF THE INVENTION

An object according to the present invention is to provide a string extraction method for an image based on a multiple stroke width patterns matching which gives consideration to the stroke width and also to the changeable width in a same stroke according to the size of the picture or the picturing distance.

Another object according to the present invention is to provide a string extraction method for an image based on a multiple stroke width patterns matching which can be applied in extracting an license plate number for an automatic recognizing system, a traffic monitoring and a car entrance guard, a container number in a container image, a string in an advertising shop sign, a string in a traffic sign image, a bar code in a bar code image, or a string in a journalism image.

For achieving the purposes described above, the string extraction method for an image based on a multiple stroke width patterns matching includes matching possible stroke width patterns with an input image for obtaining the similarities between the width patterns and each pixel, processing a function computing to the similarities between each pixel and all stroke width patterns for integrating and obtaining a numeric, wherein the numeric represents the width pattern integrated similarity of the pixel, converting the relatively larger width pattern integrated similarity of each pixel into 1and converting the relatively smaller integrated similarities into 0, wherein the integrated similarities whose values are 1represent that the pixels corresponding to thereof are located in a certain stroke of a certain character in the string, and clustering adjacent pixels of the stroke width patterns whose binarized integrated similarities are 1together to be a string area and extracting an area of the original input image corresponding to said string area to be a string image.

BRIEF DESCRIPTION OF THE DRAWINGS

The drawings disclose an illustrative embodiment of the present invention which serves to exemplify the various advantages and objects hereof, and are as follows:

FIGS. 2(A)~(C) are embodiments showing one-dimensional horizontal width patterns of the stroke according to the present invention;

FIGS. 3(A)~(C) are embodiments showing two-dimensional horizontal width patterns of the stroke according to the present invention;

Figures 4A, 4B, 4C:
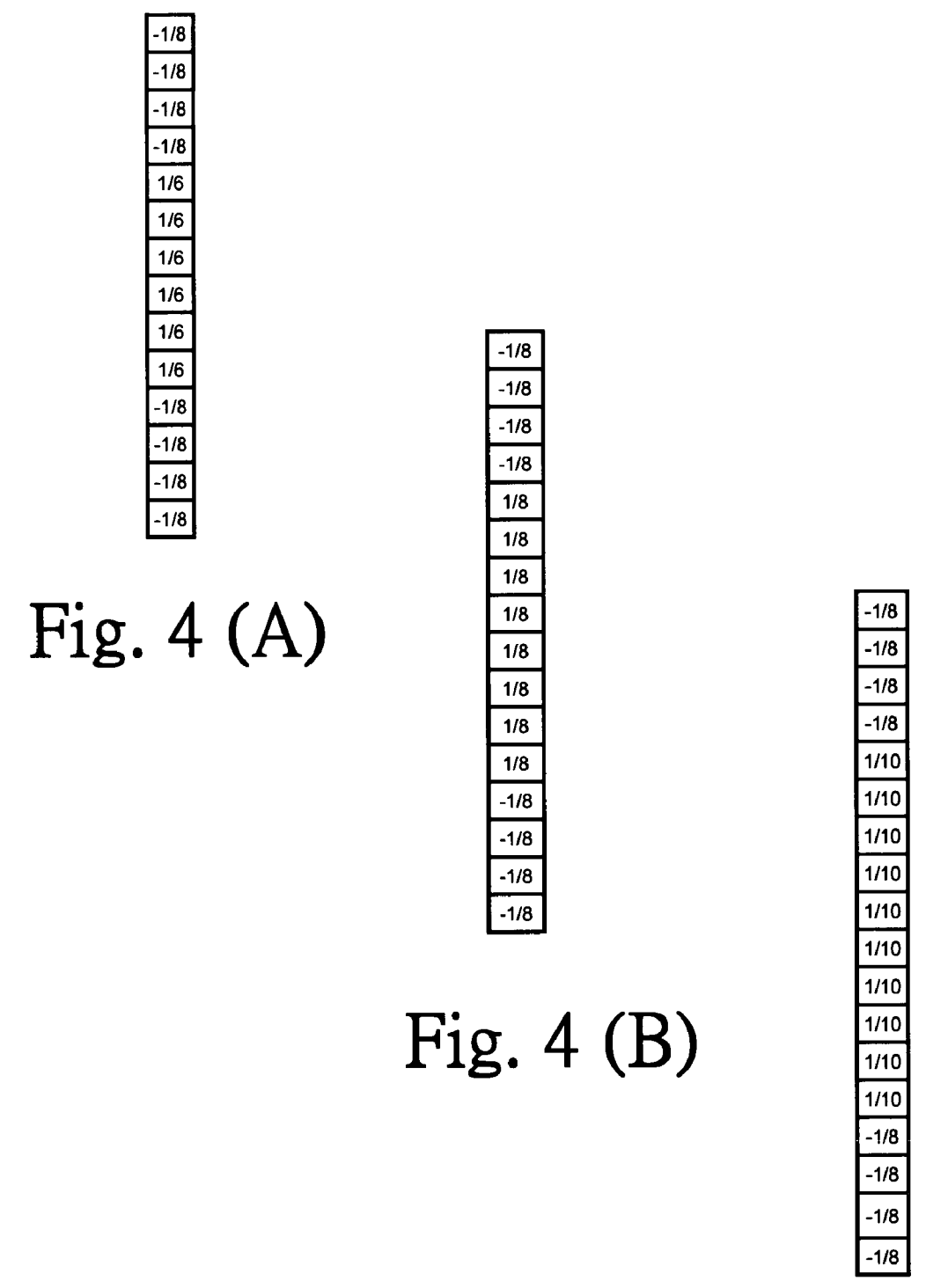

FIGS. 4(A)~(C) are embodiments showing one-dimensional vertical width patterns of the stroke according to the present invention;

Figures 5A, 5B, 5C:
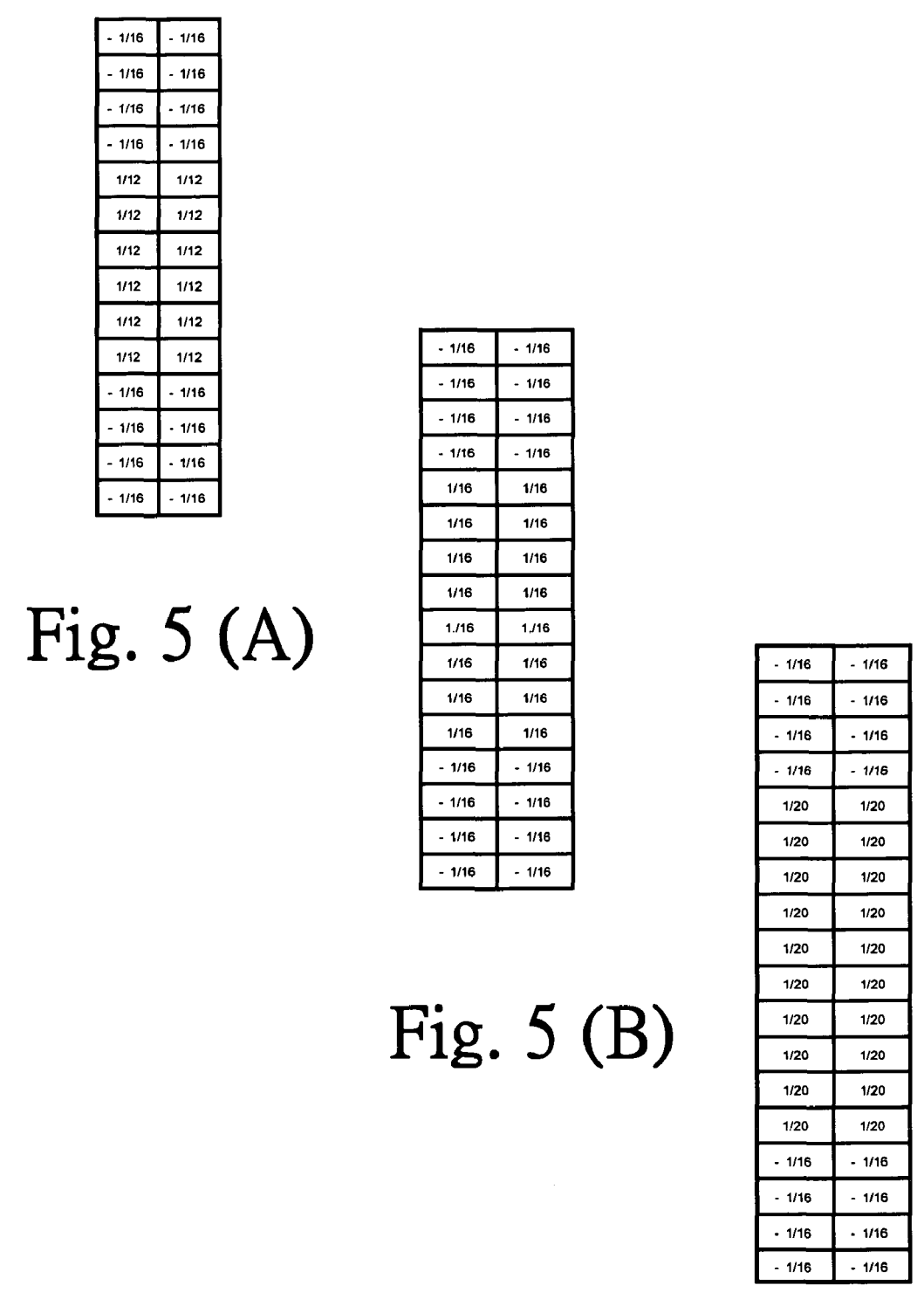

FIGS. 5(A)~(C) are embodiments showing two-dimensional vertical width patterns of the stroke according to the present invention.

DETAILED DESCRIPTION OF THE PREFERRED EMBODIMENT

The main concept of the present invention is to match possible stroke width patterns with an input image for obtaining the similarities between the width patterns and each pixel, process a function computing to the similarities between each pixel and all stroke width patterns for integrating and obtaining a numeric, wherein said numeric represents the width pattern integrated similarity of the pixel, convert the relatively larger width pattern integrated similarity of each pixel into 1and convert the relatively smaller integrated similarities into 0, wherein the integrated similarities whose values are 1represent that the pixels corresponding to thereof are located in a certain stroke of a certain character within said string, and cluster adjacent pixels of said stroke width patterns whose binarized integrated similarities are 1together to be a string area and extract an area of the original input image corresponding to said area to be a string image.

The stroke width pattern can be, but not be limited, a one-dimensional horizontal width pattern, a two-dimensional horizontal width pattern, a one-dimensional vertical width pattern, a two-dimensional vertical width pattern, and all kinds of bevel width patterns.

As to the method for match the width pattern and the image, it can match the one-dimensional or two-dimensional array which represents the width pattern with a pixel gray level array which employs any pixel as a center and has an identical array size to the width pattern for obtaining a similarity between two arrays as the similarity between the pixel and the width pattern. For example, a correlation of the two arrays can be employed as the similarity between the pixel and the width pattern, or a sum of absolute values of difference of each corresponding elements in both arrays can be employed as the dissimilarity between the pixel and the width pattern. Then, the central pixel of the pixel gray level array which is matched with the width pattern is sequentially moved for obtaining the similarities between all pixels and the width pattern.

A function computing to the similarities between each pixel and all stroke width patterns will be processed for integrating and obtaining a numeric as the width pattern integrated similarity of the pixel. And, the function computing can compute a maximum from all input parameters, an average from all input parameters, a weighted average from all input parameters, a sum from all input parameters, or a weighted sum from all input parameters etc.

Figure 1:
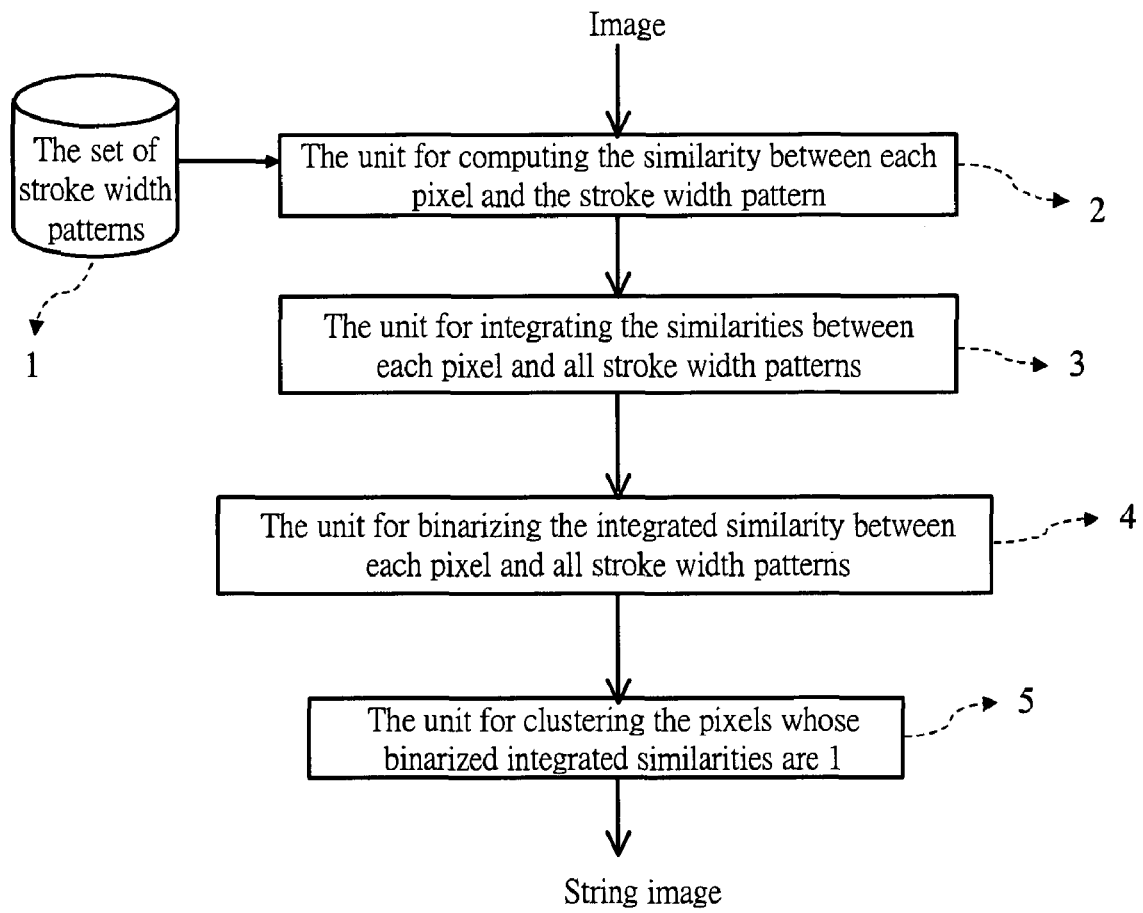
FIG. 1 is a practicing framework showing a string extraction method for an image based on a multiple stroke width patterns matching according to the present invention.
Figure 6:
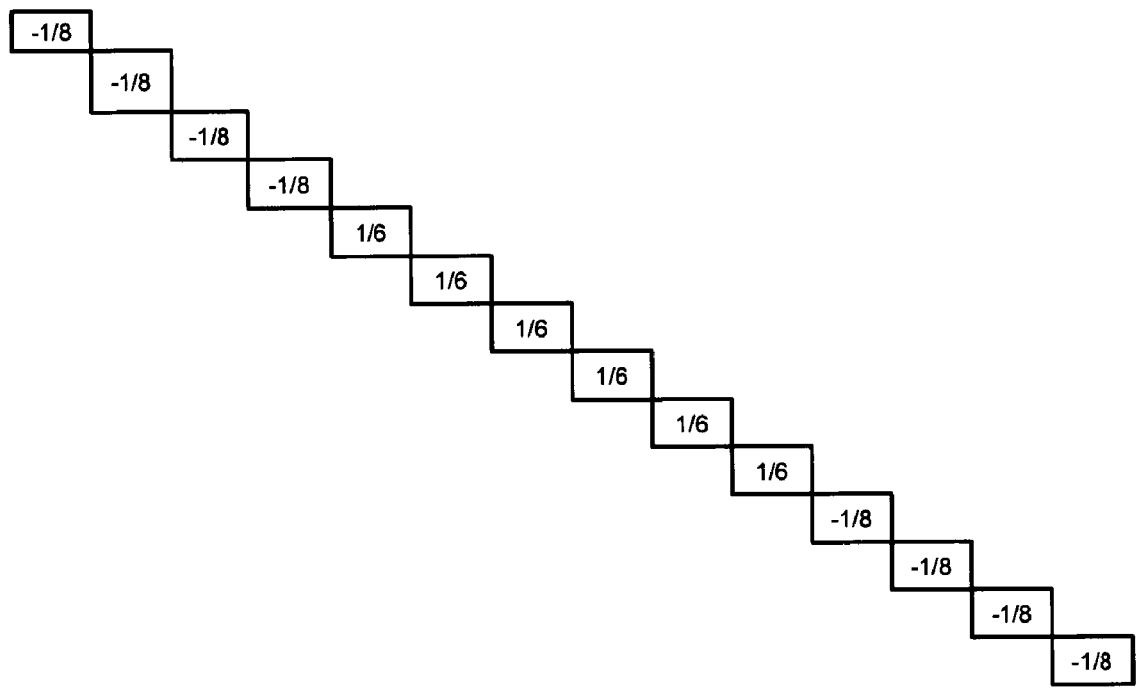
FIG. 6 is an embodiment showing a bevel width pattern of the stroke according to the present invention.

Please refer to FIG. 1, which illustrates a practicing framework of a string extraction method for an image based on a multiple stroke width pattern match. The framework includes a set 1 of stroke width patterns, a unit 2 for computing the similarity between each pixel and each stroke width pattern, a unit 3 for integrating the similarities between each pixel and all stroke width patterns, a unit 4 for binarizing the integrated similarity between each pixel and all stroke width patterns, and a unit 5 for clustering the pixels whose binarized integrated similarities are 1.

In this method, firstly the unit 2 for computing the similarity between each pixel and each stroke width pattern will match the stroke width patterns listed by the set 1 of stroke width patterns with the whole input image for obtaining the similarities between each pixel and the width patterns. As to the method for match the width pattern and the image, it can match the one-dimensional or two-dimensional array which represents the width pattern with a pixel gray level array which employs any pixel as a center and has an identical array size to the width pattern for obtaining a similarity between the two arrays as the similarity between the pixel and the width pattern. For example, a correlation of the two arrays can be employed as the similarity between the pixel and the width pattern, or a sum of absolute values of difference of each corresponding elements in both arrays can be employed as the dissimilarity between the pixel and the width pattern. Then, the central pixel of the pixel gray level array which is matched with the width pattern is sequentially moved for obtaining the similarities between all pixels and the width pattern.

Moreover, the unit 3 for integrating the similarities between each pixel and all stroke width patterns will process a function computing for integrating and obtaining a numeric. And, the numeric is namely the width pattern integrated similarity of the pixel. The function computing can compute a maximum from all input parameters, an average from all input parameters, a weighted average from all input parameters, a sum from all input parameters, or a weighted sum from all input parameters.

Furthermore, the unit 4 for binarizing the integrated similarity between each pixel and all stroke width patterns will convert the relatively larger stroke width pattern integrated similarity of each pixel into 1 and the relatively smaller integrated similarity into 0, wherein the integrated similarities whose values are 1 represent that the pixels corresponding to thereof are located in a certain stroke of a certain character in the string. The converting method can be achieved through setting a threshold. Therefore, when the stroke width pattern integrated similarity of the pixel is larger than said threshold, the integrated similarity is converted into 1, and when the stroke width pattern integrated similarity of the pixel is smaller than or equal to said threshold, the integrated similarity is converted into 0.

Finally, the unit 5 for clustering the pixels whose binarized integrated similarities are 1 will cluster adjacent pixels of the stroke width patterns whose binarized integrated similarities are 1 to from a string area, and an area of the original input image corresponding to the string area will be extracted as a string image, wherein the clustering method can be achieved by several computations through Dilation and Erosion in morphology.

Please refer to FIGS. 2~6 which show the embodiments of the stroke width patterns according to the present invention. The stroke width patterns can be, but not be limited, a one-dimensional horizontal width pattern (please refer to FIG. 2, wherein FIG. 2A is the one-dimensional horizontal width pattern whose width is 6pixels, FIG. 2B is the one-dimensional horizontal width pattern whose width is 8pixels, and FIG. 2C is the one-dimensional horizontal width pattern whose width is 10pixels), a two-dimensional horizontal width pattern (please refer to FIG. 3, wherein FIG. 3A is the two-dimensional horizontal width pattern whose width is 6pixels, FIG. 3B is the two-dimensional horizontal width pattern whose width is 8 pixels, and FIG. 3C is the two-dimensional horizontal width pattern whose width is 10pixels), a one-dimensional vertical width pattern (please refer to FIG. 4, wherein FIG. 4A is the one-dimensional vertical width pattern whose width is 6pixels, FIG. 4B is the one-dimensional vertical width pattern whose width is 8pixels, and FIG. 4C is the one-dimensional vertical width pattern whose width is 10pixels), a two-dimensional vertical width pattern (please refer to FIG. 5, wherein FIG. 5A is the two-dimensional vertical width pattern whose width is 6pixels, FIG. 5B is the two-dimensional vertical width pattern whose width is 8pixels, and FIG. 5C is the two-dimensional vertical width pattern whose width is 10pixels), and a bevel width pattern (please refer to FIG. 6 whose width is 6pixels).

The string extraction method for an image based on a multiple stroke width patterns matching according to the present invention, when being compared with the other prior arts, further includes the advantages as follows:

1. The present invention brings the stroke width into the string extraction method so as to obtain a better string stroke locating performance.

2. The present invention brings a characteristic that the width of the same stroke will be changed by the size of the picture or the picturing distance into the string extraction method so as to obtain a better string stroke locating performance.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A string extraction method for an image based on a multiple stroke width patterns matching, wherein modules for processing said method comprise a set of stroke width patterns, a unit for computing the similarity between each pixel and each stroke width pattern, a unit for integrating the similarities between each pixel and all stroke width patterns, a unit for binarizing the integrated similarity between each pixel and all stroke width patterns, and a unit for clustering the pixels whose binarized integrated similarities are 1, said method comprising the steps of:

matching stroke width patterns listed by said set of stroke width patterns with a whole input image through said unit for computing the similarity between each pixel and each stroke width pattern for obtaining the similarities between various stroke width patterns in each pixel location;

processing a function operation to the similarities between each pixel and all stroke width patterns through said unit for integrating the similarities between each pixel and all stroke width patterns for integrating and obtaining a numeric result, wherein said numeric result represents the width pattern integrated similarity of said pixel;

integrating said stroke width patterns of each pixel through said unit for binarizing the integrated similarity between each pixel and all stroke width patterns so as to convert the relatively larger similarities into 1, convert the relatively smaller similarities into 0, wherein the similarities whose values are 1 represent that the pixels corresponding thereto are located in a certain stroke of a certain character within said string; and clustering adjacent pixels of said stroke width patterns whose binarized integrated similarities are 1 to form a string area through said unit for clustering the pixels whose binarized integrated similarities are 1, and extracting an area of the original input image corresponding to said string area to be a string image.

2. The string extraction method according to claim 1, wherein said matching between said stroke width pattern and said image is processed by comparing a one-dimensional or a two-dimensional numeric array which represents said stroke width pattern with a pixel gray level array which employs any pixel as a center and has an identical array size to the width pattern for obtaining a similarity between the two arrays to be the similarity between said pixel and said stroke width pattern, and sequentially moving the central pixel of said pixel gray level array which is matched with said stroke width pattern for obtaining the similarities between all pixels and said stroke width pattern.

3. The string extraction method according to claim 1, wherein said function computing processed by said unit for integrating the similarities between each pixel and all stroke width patterns is capable of computing a maximum from all input parameters, an average from all input parameters, a weighted average from all input parameters, a sum from all input parameters, and a weighted sum from all inputted parameters.

4. The string extraction method according to claim 1, wherein said integrating processed by said unit for binarizing the integrated similarity between each pixel and all stroke width patterns for converting the relatively larger stroke width pattern integrated similarities into 1 and the relatively smaller integrated similarities into 0 is capable of setting a threshold so that when the stroke width pattern integrated similarity of the pixel is larger than said threshold, the integrated similarity is converted into 1, and when the stroke width pattern integrated similarity of the pixel is smaller than said threshold, the integrated similarity is converted into 0.

5. The string extraction method according to claim 1, wherein said clustering processed by said unit for clustering the pixels whose binarized integrated similarities are 1 for clustering adjacent pixels of said stroke width patterns whose binarized integrated similarities are 1 together to be a string area is capable of being achieved by several computations.

6. The string extraction method according to claim 1, wherein said set of stroke width patterns comprises a one-dimensional horizontal width pattern.

7. The string extraction method according to claim 1, wherein said set of stroke width patterns comprises a two-dimensional horizontal width pattern.

8. The string extraction method according to claim 1, wherein said set of stroke width patterns comprises a one-dimensional vertical width pattern.

9. The string extraction method according to claim 1, wherein said set of stroke width patterns comprises a two-dimensional vertical width pattern.

10. The string extraction method according to claim 1, wherein said set of stroke width patterns comprises a bevel width pattern.

* * * * *